Aug. 26, 1958 J. G. MARTIN 2,849,086
OVERLOAD RELEASE BRAKE MECHANISM
Filed Oct. 12, 1953 3 Sheets-Sheet 1

INVENTOR.
JOHN G. MARTIN
BY
H. O. Clayton
ATTORNEY

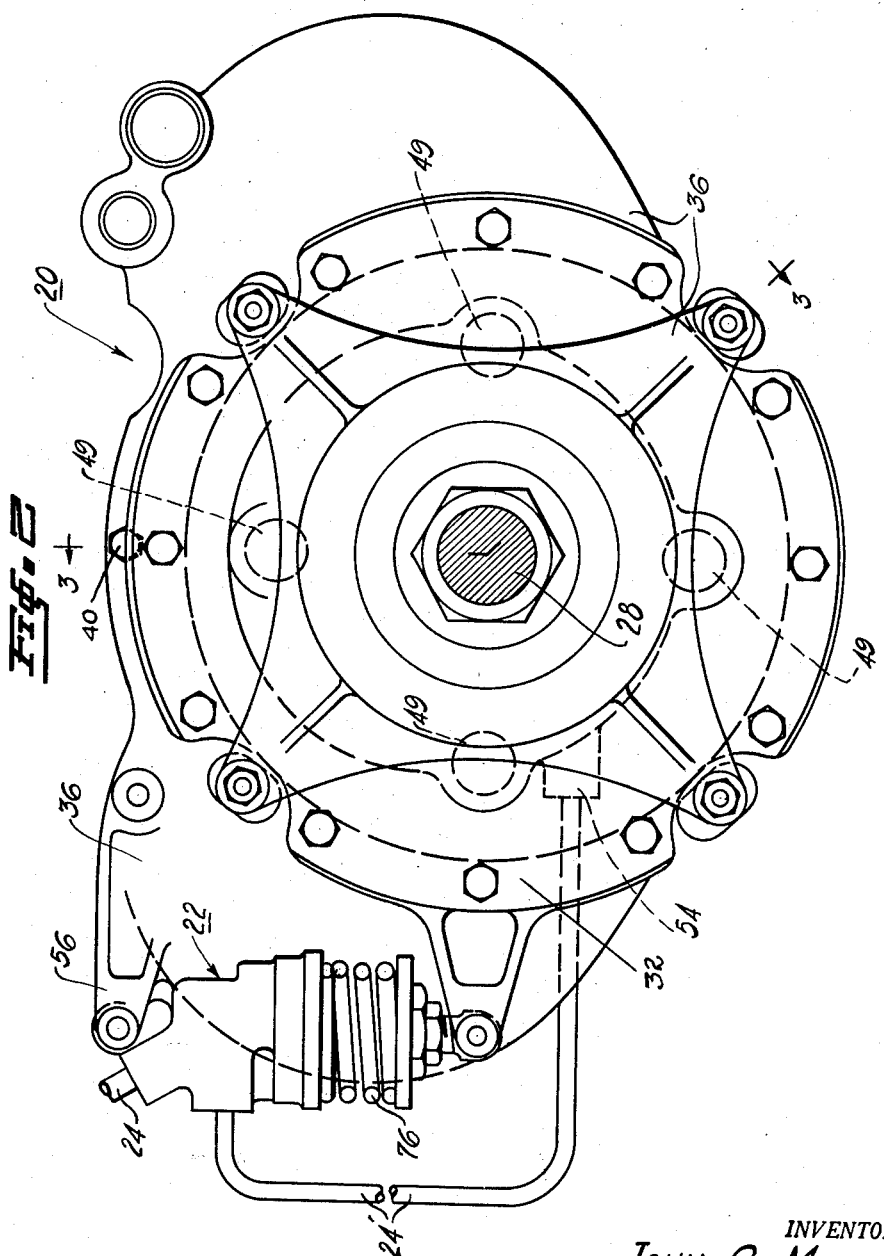

Aug. 26, 1958  J. G. MARTIN  2,849,086
OVERLOAD RELEASE BRAKE MECHANISM
Filed Oct. 12, 1953  3 Sheets-Sheet 3

INVENTOR.
JOHN G. MARTIN
BY H. O. Clayton
ATTORNEY

United States Patent Office 2,849,086
Patented Aug. 26, 1958

2,849,086

OVERLOAD RELEASE BRAKE MECHANISM

John G. Martin, South Bend, Ind., assignor to Bendix Aviation Corporation, South Bend, Ind., a corporation of Delaware Application October 12, 1953, Serial No. 385,311

2 Claims. (Cl. 188—2)

This invention relates in general to a brake mechanism and particularly to a brake mechanism suitable for controlling the operation of the engine or engines of a vehicle such as an airplane; and the brake mechanism of my invention is also adapted for use in controlling the landing gear brakes of such a vehicle.

In aircraft having a multiplicity of power plants, such as a plurality of internal combustion engines or a plurality of turbo jet engines, it is desirable to provide means, operable at the will of the pilot, to quickly render inoperative one or more of said power plants should the same become ineffective during the flight of the craft. It is an object of my invention to provide a brake mechanism operative to quickly decelerate moving parts of the engine including the drive shaft, to a state of rest.

It is a further object of my invention to provide an engine brake mechanism having a torque output which may be held to rather close limits; this is necessary because of the narrow margin between the minimum torque required to prevent the engine from windmilling and the maximum torque that can be applied through the brake drive mechanism due to design and strength limitations of the gearing engine drive shaft, etc.

A most important object of my invention is to provide, in a power operated brake mechanism suitable for use in aircraft, automatically operable sensing means for limiting the torque output of said mechanism to thereby limit the strain to which the braked mechanism, such as the drive shaft of an engine, is subjected when the brake mechanism is applied; and a further object of my invention is to provide, in the aforementioned brake mechanism, valve means, independent of the aforementioned automatically operable means, for effecting the release of the brake mechanism.

Additional objects and advantages will become apparent from the following description and accompanying drawings, wherein:

Figure 2 is an end view of the principal parts of the brake mechanism of my invention;

Figure 1:
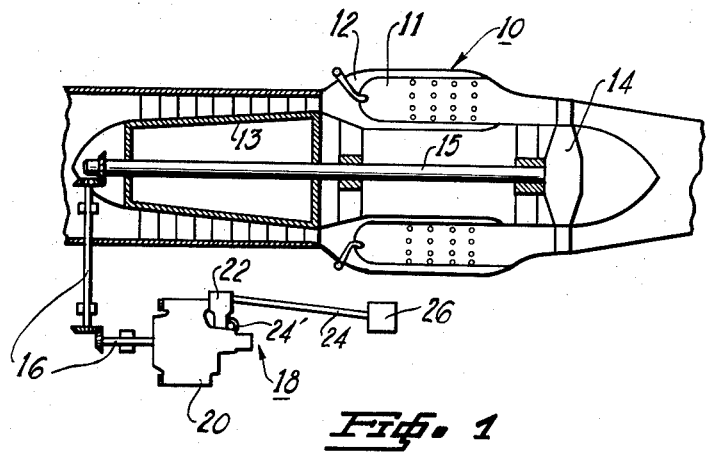
Figure 1 is a diagrammatical view disclosing the brake mechanism of my invention serving to brake an engine of an airplane.

The brake mechanism of my invention is shown applied to a gas turbine engine of an airplane; however said mechanism may be employed to brake any moving part of any vehicle such as the rotor mechanism of the landing gear brakes of an airplane. The gas turbine engine is generally indicated at 10 and includes a series of combustion chambers 11, mounted in a casing having a header or air intake section 12. A dynamic compressor is indicated at 13 and is shown as of the axial flow type, driven by means of a turbine 14 through a drive shaft 15. The shaft 15 may serve, by means including shafting 16 and other force transmitting means, to actuate a plurality of controls including an engine speed governor, not shown, and the rotor member of the brake mechanism 18 of my invention is connected to said shafting.

Now it is the principal object of my invention to provide a power brake mechanism effective, at the will of the pilot, to brake the drive shaft 15 to a stop, thereby preventing a windmill operation of the engine; however the maximum braking torque of the brake mechanism of my invention while adequate to prevent this windmill operation must be of such a factor as not to result in damage to the shafting 16, gears, and other force transmitting elements interconnecting the brake mechanism and drive shaft 15. It follows that an important feature of my invention lies in that part of the brake mechanism automatically operative, with an application of the brakes, to limit the brake reaction torque of the stator of the brake.

Figure 3:
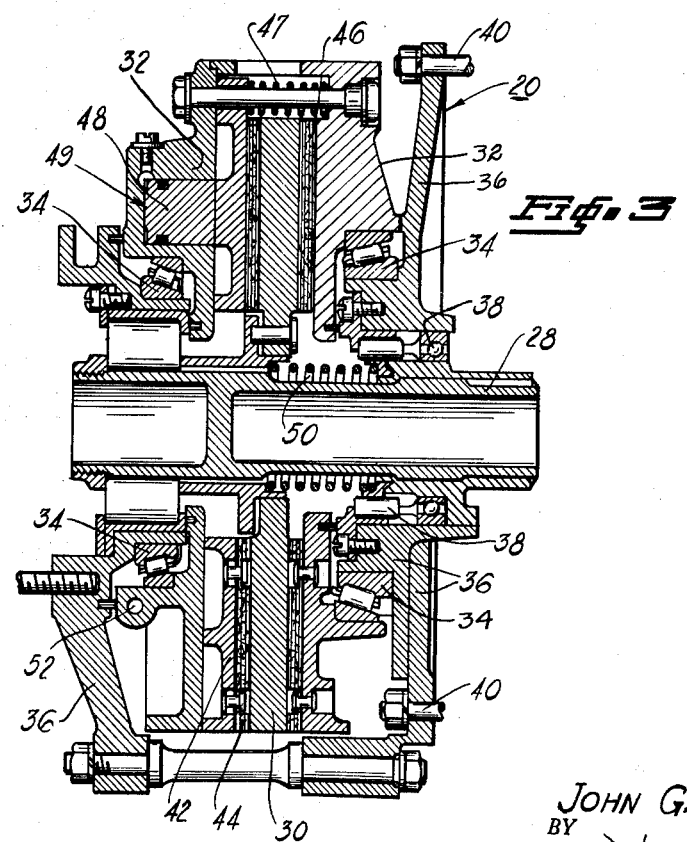
Figure 3 is a sectional view of the brake mechanism of Figure 2 taken on the line 3—3 thereof.

To this end there is provided the hydraulic brake mechanism 18 of Figure 1, said mechanism including a hydraulic brake 20 (Figures 2 and 3) preferably of the disk type having a rotor member 30, Figure 3, drivably connected to the engine drive shaft 15. A two part stator member 32, Figure 3, of the brake 20 is drivably connected to a cut-off valve 22, said valve being incorporated in a fluid transmitting connection 24, 24' interconnecting a hydraulic actuator 26 and the brake 20. The hydraulic actuator 26, which is not shown in detail and is not claimed herein, may include an electric motor driven pump operable to force power fluid to the brake 20 via the aforementioned fluid transmitting means 24, 24' and the cut-off valve 22 incorporated therein. The actuator 26 is preferably actuated, to effect an application of the brake, by the closing of a switch, not shown, located in the pilot room of the airplane; and to release the brake, the pilot then opens the switch, not shown, thereby cutting the actuator out of operation. This actuator mechanism, no claim to which is made, may also include the usual accumulator and other necessary controls.

Describing now in greater detail the brake mechanism of my invention there is disclosed, in Figures 2 and 3, a disk brake including a drive shaft 28 drivably connected to the shafting 16 disclosed in Figure 1. The rotor member 30, preferably disk shaped, is slidably keyed to the shaft 28, and a two part disk shaped stator member 32 is rotatably mounted, by suitable bearings 34, upon a two part disk shaped spider member 36 which is fixedly secured in place to a suitable support, not shown, by means including bolts 40.

The spider member 36 is sleeved over the shaft 28, and roller bearings 38 make possible the rotation of said shaft within the member 36. A ring like pressure plate 42 having a mat 44 of friction material secured thereto, is interposed between the rotor member 30 and one part of the two part stator member 32; and a mat 46 of friction material is secured to the other part of the stator member.

One part of the two part stator member 32, that is the part to the left, Figure 3, is shaped to provide a plurality of recesses each housing a piston 48 thereby providing a plurality of hydraulic motors 49 operable, when energized, to force the friction mats 44 and 46 into frictional engagement with the rotor 30 to apply the brake. Return springs 47, supplemented by a spring 50, Figure 3, serve to bias the rotor 30, pressure plate 42 and mat 44 to the left, Figure 3, to release the brake; and the aforementioned part of the stator 32 is provided with a duct 52 to receive, via a port 54 and conduit 24', Figure 2, the power fluid from the cut-off valve 22, Figures 1 and 2. As is disclosed in Figure 3 the duct 52 serves to supply the power fluid, preferably a substantially incompressible oil or equivalent fluid pressure transmitting medium, to the aforementioned hydraulic motors 49.

Figure 4:
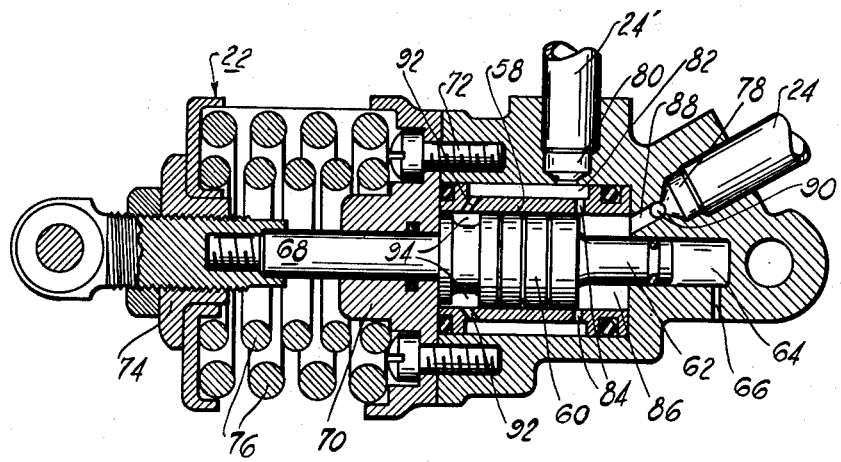
Figure 4 is a sectional view, taken on the line 4—4 of Figure 5, of the cut-off valve of the brake mechanism of my invention.
Figure 5:
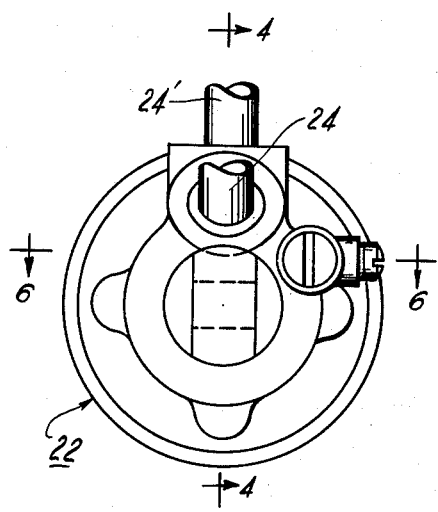
Figure 5 is an end view of the cut-off valve.

Describing now the details of the cut-off valve 22, a closed end of the casing of this valve, that is the upper end of the casing, disclosed in Figure 2, is secured to a flange 56, which is secured to the spider 36. Referring now to Figure 4 of the drawings, the casing of the valve 22 is bored to receive a cylindrical sleeve 58 which slidingly receives a spool shaped valve member 60. To one end of the member 60 there is connected a plunger 62 slidably received within a bore 64 providing a chamber which is vented to the atmosphere at 66. To the other end of the piston there is secured a shaft 68 slidably received within an opening in an end plate 70 secured to the casing of the valve by bolts 72. The outer end of the shaft 68 is threadedly mounted in an adjustable cap member 74, and a plurality of preloaded springs 76 are positioned between the plates 70 and 74, said springs serving to bias the valve member 60 to the left, Figure 4.

The valve casing is provided with an inlet port 78 connected by the conduit 24, with the actuator 26, Figure 1; and is further provided with an outlet port 80 connected, by the conduit 24', with the several brake actuating hydraulic motors 49 of the brake mechanism. The valve port 80 registers with a recess 82 in the valve member 60; and ports 84 in the sleeve 58 serve to interconnect the recess 82 and a chamber 86 outlined by the pin 62, the inner face of one end of the valve casing, and one end face of the valve member 60. This chamber 86 is connected to the inlet port 78 by ducts 88 and 90, Figures 4 and 6. Ports 92, provided in the sleeve 58, serve to interconnect a chamber 94 and the valve recess 82. With the valve member 60 moved to the right, Figure 4, this chamber is outlined by a portion of a side face of the plate 70, spaced apart relatively small grooves in the periphery of a portion 95 of the member 60, and an annular groove in the body of said member, all as is disclosed in Figure 4.

Figure 6:
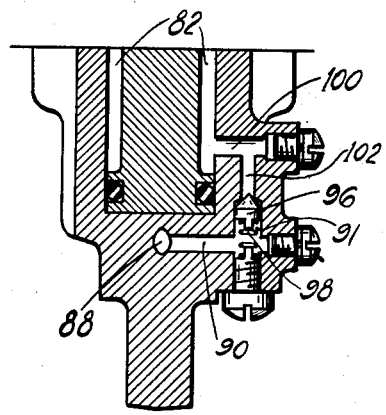
Figure 6 is a partial sectional view, taken on the line 6—6 of Figure 5, disclosing the release valve of my invention.

There is disclosed in Figure 6 an important feature of my invention in the provision of means for releasing the brake when the pilot of the plane wills this operation. This release mechanism includes a check valve 96 biased to its closed position by a spring 98. This valve serves to normally close a second fluid transmitting passage between the inlet and outlet ports 78 and 80, said passage by-passing the fluid transmitting connection between these ports provided in part by the port 84. When the pilot cuts off the actuator 26 the fluid pressure is lowered in the duct 90, Figure 6, and in a recess 91 housing the valve 96. The fluid pressure in ducts 100 and 102, Figure 6, is at the time, by virtue of the cocked return spring 50 and cooperating return springs 47, greater than the aforementioned lowered pressure in the recess 91; accordingly the valve 96 is opened by the fluid pressure to permit a flow of fluid from the hydraulic motors 49 thereby immediately releasing the brake.

Describing now the complete operation of the brake mechanism of my invention it will be assumed, say, that one of the engines of the aircraft is functioning improperly and that the pilot desires to immediately bring said engine to a stop. He accomplishes this end, after cutting off the engine fuel supply, by operating a brake actuator starter switch for that particular brake, thereby activating the actuator 26. Hydraulic fluid under pressure is then immediately forced into the hydraulic motors 49 via the conduit 24 and the ports 84 of the cut-off valve 22. This valve is at the time, that is prior to operation of the cut-off valve, opened by the operation of the springs 76. The brake is accordingly immediately applied to bring the disabled engine to a stop, and the important feature of this operation lies in the operation of the valve 22 which very shortly after the actuator 26 is energized serves to cut-off the flow of power fluid to the brake. This cut-off operation is effected by the operation of the stator member 32 which takes the reaction of the brake application. In this operation the valve member 60 is moved to the right, Figure 4, at a certain reaction factor to cut-off the flow of power fluid into the hydraulic motors 49, thereby trapping the fluid beyond the ports 84 and holding the brakes applied at a pressure that will not result in injury to the shafting 16. In this operation the springs 76 compress at this critical reaction factor; and it is also to be noted that the power fluid flows into the valve compartment 94. With the power fluid trapped at the critical brake reaction torque factor any subsequent additional buildup of brake torque, due say to a momentary change in brake lining coefficient, results in a further compression of the springs 76; and this operation results in a further movement to the right of the valve member 60 to increase the volume of chamber 94. The latter operation of course results in a lowering of the brake torque back to the aforementioned critical factor, that is the desired limit factor. Explaining this operation the rightward movement of the valve 60 is automatically stopped by virtue of the increase in volume of the chamber 94 and the consequent releasing action of the brake by virtue of the flow of brake fluid from the motors 49 back to said chamber; and after being stopped the valve 60 is immediately thereafter returned to its aforementioned cut-off position. In other words the aforementioned build-up of brake torque due to a lining coefficient change is immediately neutralized or canceled out by virtue of the presence of the chamber 94 in the mechanism of my invention.

If the brake reaction load is for any reason, say because of another lining coefficient change, reduced below the aforementioned brake applying critical factor then the valve 60 is moved back, that is to the left, Figure 4, to open the valve to increase the application of the brake to the aforementioned critical factor.

There is thus provided, by the cut-off valve 22, automatically operable sensing means for limiting to a certain factor the brake applying load effected by the hydraulic motor. The rate of the springs 76, size and position of the conduits and other parts of the mechanism, viscosity of the power fluid and other factors will determine the time of operation of the valve 22 and the maximum brake applying pressure of the mechanism. It is also to be noted that the mechanism of my invention automatically compensates for variations of lining coefficients, thus the lining coefficient may, with no deleterious effect, vary during the operation of the mechanism.

To release the brake mechanism of my invention the pilot opens the release switch, not shown, to cut-off the actuator 26 whereupon, as described above, the check valve 96 immediately opens to release the brake, the trapped power fluid flowing from the hydraulic motors and by-passing the port 84 and chamber 86 of the cut-off valve.

Although a particular embodiment of my invention has been described, it will be understood by those skilled in the art that the object of the invention may be attained by the use of constructions different in certain respects from that disclosed without departing from the underlying principles of the invention. I therefore desire by the following claims to include within the scope of my invention all such variations and modifications by which substantially the results of my invention may be obtained through the use of substantially the same or equivalent means.

I claim:

1. The combination with a driven shaft drivably connected to a shaft to be braked, of a fixedly mounted two-part spider member having its parts spaced apart and sleeved over the driven shaft, a disk type brake mechanism located between the parts of the spider member and comprising a disk like rotor member sleeved over the driven shaft and drivably connected therewith, friction means positioned on each side of the rotor member, a pressure plate positioned adjacent a part of the friction means, a two-part stator member rotatably mounted on the driven shaft, one of the parts of said member being mounted on one side of the rotor member and the other of said parts being mounted on the other side of the rotor member, means for securing the stator members together, fluid operated motor means mounted in one of the stator members and operable, through the intermediary of the pressure plate, to force the friction means into braking engagement with the rotor member, and means for controlling the operation of said motor means comprising a spider mounted cut-off valve and means, including yieldable means, operably connecting one of the stator member parts with the valve and operable to actuate said valve to limit the operation of the brake.

2. The combination with a driven shaft drivably connected to a shaft to be braked, of a fixedly mounted two-part spider member having its parts spaced apart and sleeved over the driven shaft, a disk type brake mechanism located between the parts of the spider member and comprising a disk like rotor member sleeved over the driven shaft and drivably connected therewith, friction means positioned on each side of the rotor member, a pressure plate positioned adjacent a part of the friction means, a two-part stator member rotatably mounted on the driven shaft, one of the parts of said member being mounted on one side of the rotor member and the other of said parts being mounted on the other side of the rotor member, means for securing the stator members together, fluid operated motor means mounted in one of the stator members and operable, through the intermediary of the pressure plate, to force the friction means into braking engagement with the rotor member, and means for controlling the operation of said motor means comprising a spider mounted cut-off valve automatically operative, after its cut-off operation and by virtue of a fluid receiving chamber therein which increases in its volume as the valve is actuated in one direction, to maintain the cut-off limit of operation thereof, and means, including yieldable means, operably connecting one of the stator member parts with the valve and operable to actuate said valve to limit the operation of the brake.

References Cited in the file of this patent

UNITED STATES PATENTS

| | | |
|---|---|---|
| 2,243,449 | Aikman | May 27, 1941 |
| 2,277,554 | McCoy | Mar. 24, 1942 |
| 2,435,338 | Booth | Feb. 3, 1948 |
| 2,483,362 | Bois et al. | Sept. 27, 1949 |
| 2,485,623 | McNairy | Oct. 25, 1949 |
| 2,598,362 | Daniels | May 27, 1952 |
| 2,611,453 | Vaughn | Sept. 23, 1952 |
| 2,642,971 | Hagenbook | June 23, 1953 |
| 2,646,150 | Hobbs | July 21, 1953 |
| 2,736,394 | Hewitt | Feb. 28, 1956 |